US012741555B2

(12) United States Patent
Lombardo et al.

(10) Patent No.: US 12,741,555 B2
(45) Date of Patent: Sep. 22, 2026

(54) APPARATUS FOR AND METHOD OF GUIDING AN ELECTRIC VEHICLE

(71) Applicants: BRUSA ELEKTRONIK AG, Buchs (CH); POZYX NV, Ghent (BE)

(72) Inventors: Paolo Lombardo, Munich (DE); Martin Weber, Munich (DE); Samuel Van De Velde, Lochristi (BE); Stefan Raabe, Munich (DE)

(73) Assignee: BRUSA ELEKTRONIK AG, Buchs (CH)

( * ) Notice: Subject to any disclaimer, the term of this patent is extended or adjusted under 35 U.S.C. 154(b) by 325 days.

(21) Appl. No.: 17/917,141

(22) PCT Filed: Apr. 13, 2021

(86) PCT No.: PCT/EP2021/059498
§ 371 (c)(1),
(2) Date: Oct. 5, 2022

(87) PCT Pub. No.: WO2021/209416
PCT Pub. Date: Oct. 21, 2021

(65) Prior Publication Data

US 2023/0158912 A1 May 25, 2023

(30) Foreign Application Priority Data

Apr. 14, 2020 (DE) ..................... 10 2020 110 220.8

(51) Int. Cl.
*B60L 53/38* (2019.01)
*B60L 53/126* (2019.01)
(Continued)

(52) U.S. Cl.
CPC ............. *B60L 53/38* (2019.02); *B60L 53/126* (2019.02); *B60L 53/31* (2019.02); *B60L 53/36* (2019.02); *H02J 50/10* (2016.02); *H02J 50/90* (2016.02)

(58) Field of Classification Search
CPC ........ B60L 53/38; B60L 53/126; B60L 53/36; B60L 53/31; H02J 50/90; H02J 50/10
See application file for complete search history.

(56) References Cited

U.S. PATENT DOCUMENTS 10,320,245 B2 6/2019 Sieber
2018/0208073 A1* 7/2018 Roehrl .................... B60L 53/36
(Continued)

FOREIGN PATENT DOCUMENTS

CN 108370367 A 8/2018
EP 3364522 A1 8/2018
(Continued)

OTHER PUBLICATIONS

International Search Report issued in International Application No. PCT/EP2021/059498 on Jul. 21, 2021.

*Primary Examiner* — James J Lee
*Assistant Examiner* — Steven Vu Nguyen
(74) *Attorney, Agent, or Firm* — Hoffmann & Baron, LLP

(57) ABSTRACT

An apparatus and method of determining relative position of a ground coil and a vehicle coil, enabling an electric vehicle to be guided to a position at which energy is transferable between the ground and vehicle coils. Position signaling devices are mountable relative to the ground and vehicle coils. At least one signaling device is associated with one of the coils and two or more signaling devices are associated with the other of the coils. Each signaling device is able to transmit or receive, or transmit and receive positioning signals for or from other ones of the signaling devices. The positioning signals are processed to obtain time-related (Continued)

information. The time-related information is obtained using at least two positioning protocols from a set of protocols. This enables determination of distances between the signaling devices and thus the relative position of the ground and vehicle coils.

12 Claims, 6 Drawing Sheets

(51) Int. Cl.

| | |
|---|---|
| ***B60L 53/31*** | (2019.01) |
| ***B60L 53/36*** | (2019.01) |
| ***H02J 50/10*** | (2016.01) |
| ***H02J 50/90*** | (2016.01) |

(56) References Cited

U.S. PATENT DOCUMENTS

2018/0241258 A1* 8/2018 Seong ...................... G01B 7/14
2018/0375390 A1* 12/2018 Sieber ..................... B60L 53/22

FOREIGN PATENT DOCUMENTS

WO WO2017/066629 A1 4/2017
WO WO2019/125484 A1 6/2019

* cited by examiner

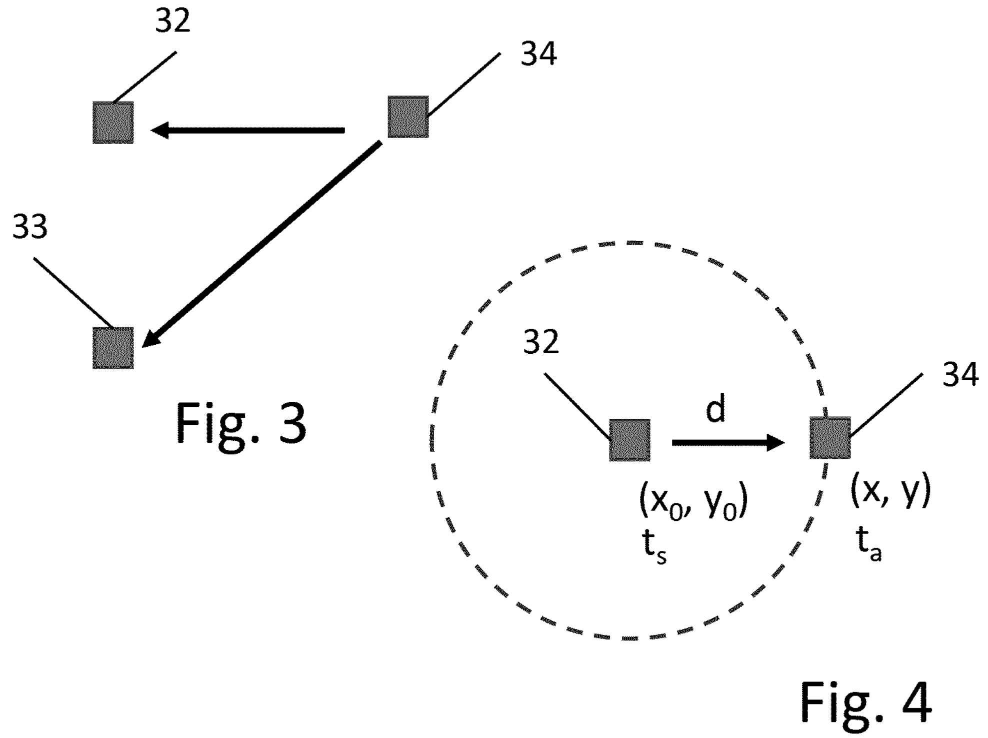
Fig. 3
Fig. 4
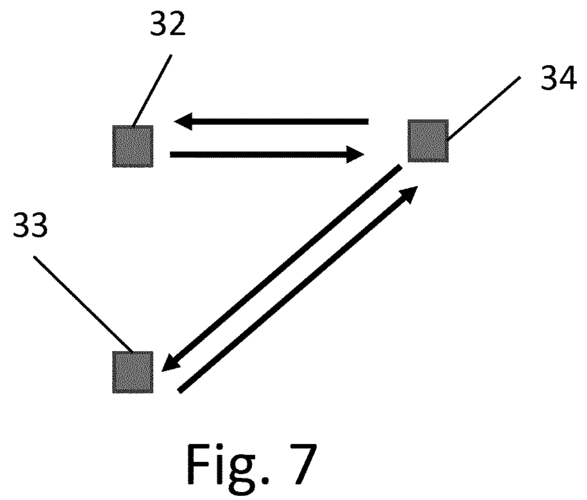
Fig. 7

36
34"
34'
32
37
33

36
34
32
37
33
39
38

APPARATUS FOR AND METHOD OF GUIDING AN ELECTRIC VEHICLE

CROSS-REFERENCE TO RELATED APPLICATIONS

The present application is the U.S. National Phase of PCT/EP2021/059498, filed on 13 Apr. 2021, which claims priority to German Patent Application No. 10 2020 110 220.8, filed on 14 Apr. 2020, the entire contents of which are incorporated herein by reference.

BACKGROUND

Field

An apparatus for use in guiding an electric vehicle to a position in which a magnetic coil on the vehicle is placed relative to a supply magnetic coil at a charging location such that energy can be transferred between the vehicle coil and the supply coil; a pad module for use with another pad module to transfer power magnetically in an electric vehicle charging system; and a method of guiding an electric vehicle to a position in which a vehicle magnetic coil is placed relative to a ground magnetic coil at a charging location such that energy can be transferred between the vehicle coil and the ground coil.

Related Art

Wireless power transfer techniques are increasingly being used to transfer power from electrical power sources to a wide range of devices from small hand-held consumer electronics devices, such as mobile phones and tablets requiring a few watts of power, to electric vehicles requiring kilowatts of power. In addition to the convenience of not having to plug in a device to power it or recharge its batteries, the absence of wires and cables makes for tidier desks and parking spaces, while reducing clutter, trip and shock hazards. There are several ways in which power may be transferred wirelessly, including capacitive coupling and inductive coupling, both of which offer advantages over resistive (i.e., wired) coupling for the purpose of supplying power to a device.

Wireless power transfer systems can be designed to deliver anything from fractions of a watt, a few watts to many kilowatts from a power source across a gap to a device or load. Typically, the gap is an air gap between magnetic coils, although other techniques include the delivery of power between plates of a capacitor. And they can be designed to operate at fixed or variable frequencies which can be useful for varying load conditions.

The energy thus delivered may be used for, example, to power an electronics circuit or to power a device. This includes powering a consumer device such as a cell phone or tablet. It also includes driving an electric motor in an electric vehicle and charging batteries in the circuit or vehicle. Powering a cell phone or charging its battery requires a few watts, whereas powering the motor in an electric vehicle or charging the battery requires several kilowatts. The larger the battery, circuit or motor, or the faster the battery is required to charge, the greater the power that must be transferred across the air gap.

Wireless power transfer techniques have developed in different fields of technology which has resulted in different terms being used to describe essentially the same thing. Such terms as 'magnetic coupling,' 'magnetic induction,' 'inductive power transfer,' 'inductive charging' and 'resonant inductive power transfer' are common. Although there may be minor differences, these terms are generally used broadly and interchangeably to refer to systems that transfer power from a source across an air gap to a load by way of a magnetic field. The term 'inductive charging system' or ICS will be used herein to identify this kind of system.

In a similar vein, various terms are used to refer to different elements of an inductive charging system (ICS). Essentially an ICS comprises equipment associated with the power supply and equipment associated with the device. The power supply equipment comprise circuitry that converts energy from the power supply into a form suitable for driving a coil. Similarly, the device equipment converts energy induced in a coil by the magnetic field into a form suitable for powering the device or charging batteries in the device.

Inductive charging systems can be used to charge batteries in electric vehicles. Drivers can park their cars over charging equipment on the ground, which couples magnetically with a charging equipment on the vehicle to transfer energy to the battery. For autonomous vehicles inductive charging eliminates the need to manually connect the vehicle to a supply once it has driven to a charging location. When needed, power from the vehicle's battery may be fed back into the power source, e.g., the power network in a smart home or a utility company's power grid.

In an inductive charging system (ICS) for use with electric vehicles the power supply equipment has various names including ground assembly, ground pad and ground pad module (GPM) which is connectable to a main power supply. The device equipment is variously known as the vehicle assembly, the vehicle pad or the car pad module (CPM) and is mountable in a vehicle such as a car to provide energy to charge the vehicle's battery. The naming in many situations depends on what language is adopted by a given manufacturing company. Naturally, an electric vehicle ICS is capable of working with diverse vehicles, including cars and heavier road vehicles, including trucks, buses and trams, and is not limited to use with cars, be they road-going or otherwise. The terms 'ground pad module' (GPM) and 'car pad module' (CPM) will be used herein to identify the two parts of an ICS for electric vehicles.

Other terms that vary between different implementations of an ICS include 'magnetic coils', 'induction coils' and 'antennas.' These terms too are used loosely and essentially interchangeably to describe the parts of an inductive charging system that transfer energy across the air gap. Although nothing should turn on the use of these different terms, it is worth noting for the sake of accuracy that the elements are actually coils rather than antennas. This is because at typical operating frequencies the elements transfer energy in the near field where only the magnetic field is present.

Antennas are designed with the electromagnetic field in mind, which forms once the radiated energy passes from beyond the near field to the far field. Where the near field ends and the far field begins depends on characteristics of the transmitting device (e.g., coil or antenna). For wireless power transfer applications an exact definition is usually unnecessary because the size of the air gap and the frequencies that the system operates places it firmly in the near field. Nevertheless, the aforementioned 'magnetic coils,' induction coils' and 'antennas' are similarly used interchangeably by those active in designing wireless power transfer devices and systems.

Inductive charging systems may use magnetic coils either alone or coupled with other tuned or tuneable elements. In electric vehicle power transfer applications, a ground pad module may contain a coil in combination with associated driving electronics or it may contain the coil with some or all the associated electronics being provided in a separate enclosure. Either way, the coil in the ground pad module is used to transmit power via a magnetic field. Similarly, a car pad module may contain a coil in combination with associated control electronics or it may contain the coil with some or all the associated electronics being provided in a separate enclosure. Either way, the coil in the car pad module is used to receive power via a magnetic field.

One area of focus in the design of inductive charging systems is accurate alignment of the ground coil and the vehicle coil. Poor alignment reduces efficiency of the energy transfer. When the system is operational, the magnetic field can transfer large amounts of energy across the space between the ground pad module and the vehicle pad module. Even a small domestic system in use generates a magnetic field capable of transferring 2 to 3 kW of energy between the pads. Other systems operate at much higher power levels. An inefficient link between the ground and vehicle pads leads to stray currents in conducting elements of the system. The energy therefrom is converted to heat. So not only is energy lost, but it also causes heating, which is plainly undesirable.

With this in mind, effort has been put into designing inductive charging systems that are able to assist an operator (e.g., a driver of a vehicle) in positioning the vehicle coil over the ground coil to optimise power transfer and minimize losses and the problems associated therewith.

SUMMARY

As defined in the claims, the invention provides an apparatus for use in guiding an electric vehicle to a position in which a magnetic coil on the vehicle is placed relative to a supply magnetic coil at a charging location such that energy can be transferred between the vehicle coil and the supply coil; a pad module for use with another pad module to transfer power magnetically in an electric vehicle charging system; and a method of guiding an electric vehicle to a position in which a vehicle magnetic coil is placed relative to a ground magnetic coil at a charging location such that energy can be transferred between the vehicle coil and the ground coil.

An apparatus for and method of determining the relative position of a ground coil and a vehicle coils enables an electric vehicle to be guided to a position at which energy can be transferred between the ground and vehicle coils. Position signaling devices are mountable relative to the ground and vehicle coils. At least one signaling device is associated with one of the coils and two or more signaling devices are associated with the other of the coils. Each signaling device is able to transmit, or receive, or transmit and receive signals for or from other ones of the signaling devices. Signals are processed to obtain time-related information from the positioning signals. The information is obtained using at least two positioning protocols from a set of protocols including time of flight, two-way ranging, time difference of arrival and phase difference of arrival. This enables determination of distances between signaling devices and thus the relative position of the ground and vehicle coils.

The invention and features thereof are set forth with particularity in the claims and together with advantages thereof may become clearer to those possessed of the appropriate skill from consideration of the following detailed description given by way of example with reference to the accompanying drawings.

BRIEF DESCRIPTION OF THE DRAWINGS

FIG. 3 illustrates one way of using signals between a source and two receivers in determining position;

FIG. 4 identifies coordinates and times of flight between two signalling devices;

FIG. 7 illustrates another way of using signals between a source and two receivers in determining position;

DETAILED DESCRIPTION

Figure 1:
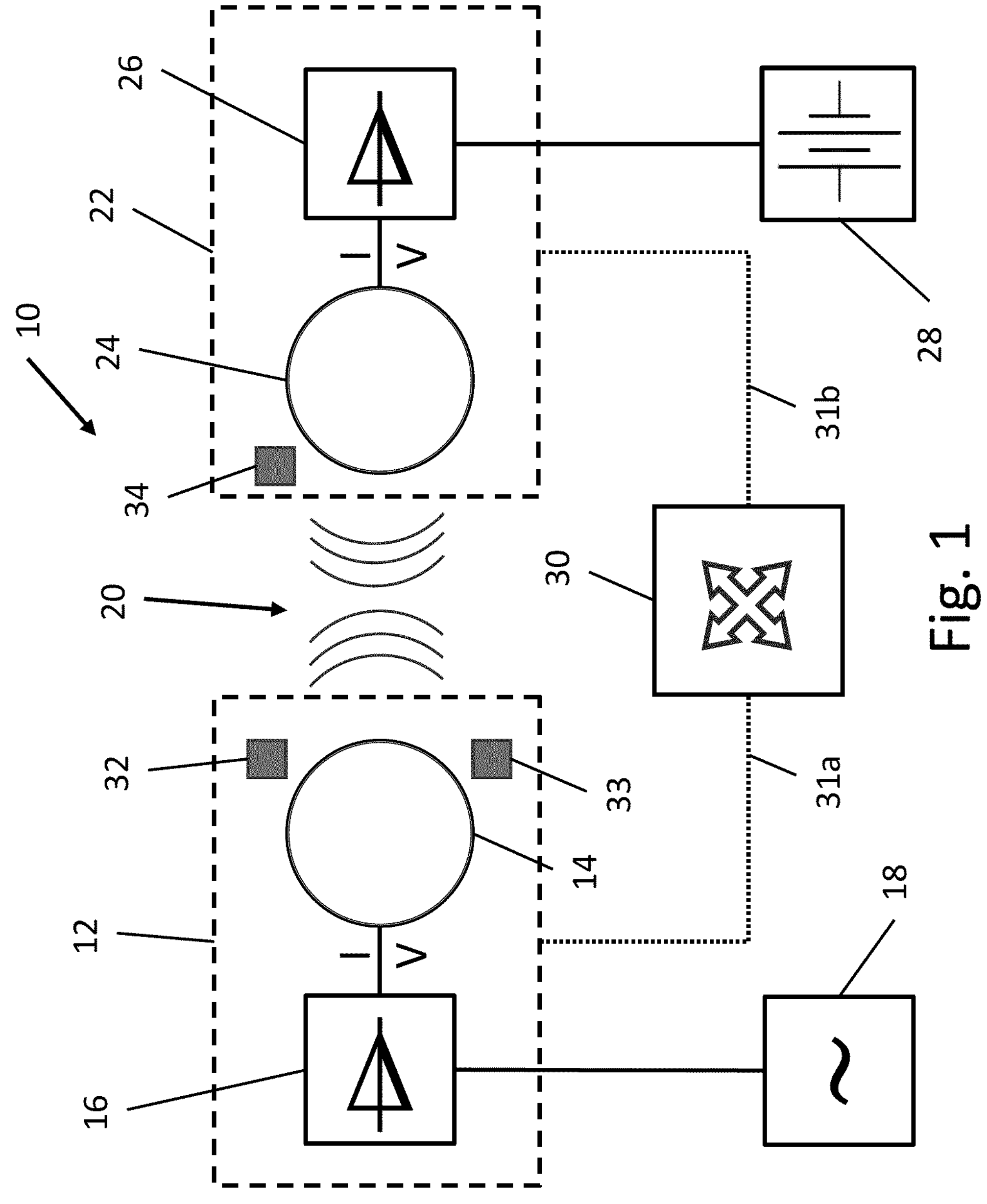
FIG. 1 is a block diagram of an inductive power transfer system.

Turning now to FIG. 1 of the accompanying drawings, an inductive charging system (ICS) 10 for use in charging a battery in an electric vehicle. The ICS 10 comprises a ground pad module (GPM) 12 containing a ground or supply coil 14 and driving circuitry 16 couplable to an electrical power supply 18. Power signals from the supply 18 are conditioned by the driving circuitry 16 to put them in suitable form for application to the supply coil 14. The coil 14 is driven by this application of the power signals—represented as current I and voltage V—to generate a magnetic field 20.

The power supply 18 may be a domestic voltage supply at, e.g., 110*v* or 220*v*. Such domestic installations would be limited to 2-3 kW, meaning that the charging of a battery will typically take several hours. A larger power supply such as a poly- (plural) phase supply at 415 volts or higher enables charging to be completed more quickly. Larger powers—and therefore faster charging—may be provided in commercial or industrial implementations.

The size and form of the ground pad module 12 depends on the technical requirements of the system. The supply coil 14 is depicted as a circle in FIG. 1, but it could be any polygonal or elliptical shape. The coil 14 may be configured as a solenoid, arranged in a double-D configuration or any other of the widely available coil topologies. The exact form is determined by the technical requirements of the system and on routine design choices. To give an idea of size, the ground pad module 12 is typically around 600 mm in width. The height of the GPM 12 should be as low as possible to avoid the GPM causing a snagging hazard with the underside of a vehicle or a tripping hazard.

The inductive charging system 10 also comprises a car pad module (CPM) 22. In use, the CPM 22 is placed on a car (not shown) at a location determined by design considerations, e.g., under the chassis or floor pan. When the car is driven over the GPM 12 and the CPM 22 positioned thereover, energy can be transferred from the GPM to the CPM. The magnetic field 20 is converted by a car or vehicle coil 24 into power signals—represented as current I and voltage V—that are conditioned by driving circuitry 26 to put them in a form suitable to deliver energy to, and thus charge, a battery 28.

As with the ground pad module (GPM) 12, the size and form of the CPM 22 is governed by technical requirements and choices made when designing the inductive charging system 10. The car pad module (CPM) 22 is similarly provided in a package. Again, the exact form of the vehicle coil 24 and thus the shape and size of the CPM 22 is determined in the most part by technical requirements and design choices. The coil 24 need not be circular as depicted and, indeed, it need not even have the same form or topology as the coil 14 in the ground equipment 12. Space in a vehicle is limited. The aim usually is to make the CPM 22 as small as possible, e.g., around 300 mm in width.

A controller 30 serves to control operation of the GPM 12 and CPM 22. Although shown as a single unit in FIG. 1, the controller 30 may be wholly in the GPM 12 or the CPM 22 or have elements placed in, the GPM 12 and the CPM 22. Among other things, the controller 30 provides a way for the two parts 12, 22 of the system 10 to communicate with each other, as represented by the dashed lines 31*a* and 31*b* in the drawing. The communication medium may be any one of the widely available wireless protocols, including Wi-Fi and Bluetooth.

In use, information is transferred between the GPM 12 and the CPM 22, for example, to control operation, e.g., to control generation of the magnetic field 20 to optimise power transfer and minimise losses. Safety features (not shown) may be included in the system 10 that send signals to the controller 30 indicating when power transfer may begin or end or when it must be interrupted because of a hazard situation such as a foreign or living object entering the magnetic field 20.

One convenience of an ICS 10 is that the battery 28 on a vehicle may be charged simply by parking the vehicle over the ground pad 12 in a position where the car pad module 22 and the ground pad module 12 are aligned. Vehicle guidance and alignment equipment is provided to assist the driver in correctly positioning the vehicle, and thus the car pad module 22, relative to the ground pad module 12.

Figure 2:
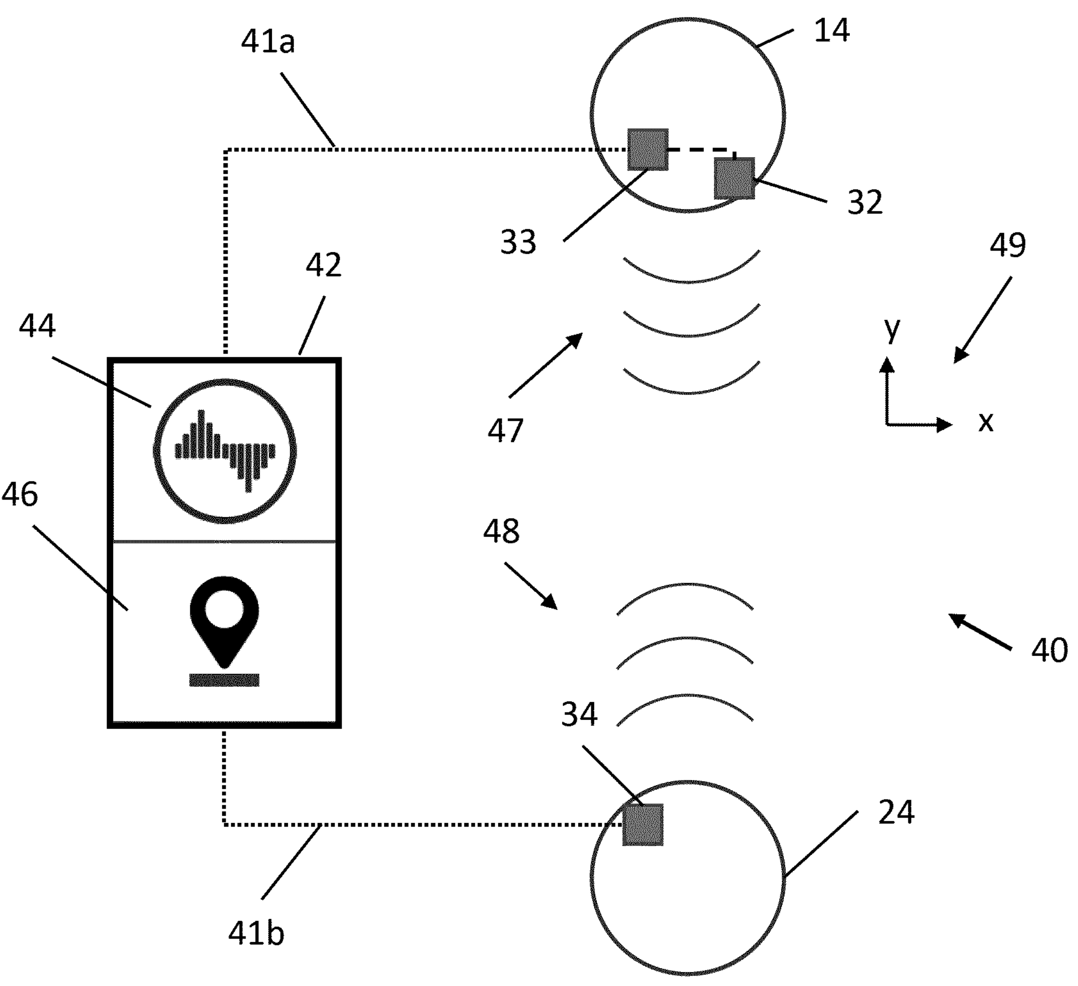
FIG. 2 is a block diagram showing elements of a positioning apparatus for use with an inductive power transfer system.

The inductive charging system 10 includes a positioning apparatus 40 or subsystem which is illustrated in FIG. 2 of the accompanying drawings. The positioning apparatus 40 is provided with a number of position signalling devices 32, 33 and 34 that transmit or receive or transmit and receive signals that enable relative positions between the GPM 12 and CPM 22 to be determined. Although FIG. 2 shows two signalling devices 32, 33 on the ground pad module 12 and one on the car pad module 22, it will be appreciated that the signalling devices could be placed the other way around, i.e., one on the GPM 12 and two on the CPM 22.

Operation of the signalling devices, 32, 33, 34 is controlled by the positioning apparatus 40. The positioning apparatus 40 is shown separately from the inductive charging system (ICS) 10 for the sake of convenience of explanation. As with the ICS controller 30 shown in FIG. 1, the positioning apparatus 40 may be included in or alongside the ICS system 10. It may be placed in the ground pad module GPM 12 or the car pad module CPM 22 or distributed between the GPM and the CPM. Indeed, the functionality of the positioning apparatus 40 could be integrated into the ICS controller 30 either partially or wholly.

In early adoption of wireless vehicle charging, it is expected that automobile companies will supply an entire charging system, i.e., both GPM and CPM, to customers. As the market develops, supply of the GPM may be vested with third parties, with a desire to make the CPM as reliable, light and as cheap as possible. In future, a greater proportion of the system control, including the positioning apparatus 40 of FIG. 2, may therefore be placed in the GPM. Naturally, some of the positioning apparatus will remain in the CPM or the vehicle or both. Exactly how much is a matter of choice depending on constraints and practicalities in the design specification.

The positioning apparatus 40 comprises a process controller 42 which, at a high level, serves two main tasks represented by a signal processor 44 and a positioning controller 46. At the high level, the signal processor 44 processes transmitted and received signals 47, 48 associated with each of the signalling devices 32, 33, 34 to extract time related information, and thus distance data, therefrom. And, again at the high level, the positioning controller 46 uses information and data from the signal processor 44 to determine position relative to a coordinate system or frame of reference.

These tasks could be provided separately. But in practice, because the operations are interrelated, it will usually make engineering and commercial sense to provide them as a unit as shown. Indeed, the processing and positioning functionality of the process controller 42 may be shared between the GPM 12 and the CPM 22 or replicated in both the GPM and the CPM.

The process controller 42 communicates with the signalling devices 32, 33, 34 associated with the GPM coil 14 and the CPM coil 24 via communication channels 41*a*, 41*b*. The channels 41*a*, 41*b* serve to transfer data between parts of the positioning apparatus 40. This is similar to the way in which the controller 30 of the system 10 of FIG. 1 controls coupling of the GPM 12 and the CPM 22. It follows that the channels 41*a*, 41*b*, could be included in or made part of the channels 31*a*, 31*b* associated with the controller 30. Indeed, some or all of the functionality of the process controller 42 could be included in or provided by the ICS controller 30. The distribution of the various elements of the positioning apparatus 40 is a matter of design choice governed by the requirements and practicalities of a given implementation.

The process controller 42 determines the position of the coils relative to a coordinate system (x, y) 49. The position of the coordinate system (x, y) 49 is arbitrary in that it can be defined at any location. In practice it is convenient for the coordinate system to be centred on one or other of the coils 14, 24, with the position of the other coil being defined relative thereto. Usually the coordinate system 49 will be defined relative to the stationary coil in the GPM. For example, the origin (O, O) of the coordinate system can be conveniently located at the centre of the CPM 22 with the x-axis aligned to the driving direction of the vehicle (not shown).

The signalling devices 32, 33, 34 are shown placed at arbitrary positions on the coils 14 and 24. In practice, the position of the supply and vehicle coils 14, 24 relative to each other will be calculated at a known location on each coil, e.g., their centres. But in a given system it may not be possible to place the signalling devices 32, 33, 34 exactly at the centres of the coils 14, 24. Other equipment may take priority in being located there.

Indeed, there is no reason why the signalling devices have to be placed in or on the ground pad module 12 or car pad module 22. They could be placed at the edges of a parking space and at arbitrary positions on a vehicle. As long as the offsets from the centre of a coil to each signalling device 32, 33, 34 is known, accurate position data can be calculated.

The signalling devices associated with a fixed element or position are sometimes called anchors and those associated with a moving element or position are called tags. Anchors and tags do essentially the same thing, namely, transmit, receive or transmit and receive signals in a manner that enables the position(s) of tag(s) to be determined relative to the position(s) of anchors. 'Anchor' and 'tag' are convenient labels that identify whether the signalling unit is associated with a fixed position (e.g., the GPM 12) or a movable or moving position (e.g. the CPM 22) respectively.

In the ICS 10 of FIG. 1 and the positioning apparatus 40 of FIG. 2, the signalling devices 32, 33 are positioned on the GPM 12 relative to the coil 14. Likewise, the signalling device 34 is positioned on the CPM 22 relative to the coil 24. Since the GPM 12 is deployed on the ground it is easier to consider the signalling devices 32, 33 to be associated with a fixed position. Similarly, since the CPM 22 is deployed on a vehicle, it is easier to consider the signalling device 34 to be associated with a moving position. But the mathematics works equally well with the signalling device 34 associated with the ground or the GPM 12 and the signalling devices 32, 33 on the vehicle or CPM 22.

It is common practice for the signals transmitted between the signalling devices in a positioning system to be ultra-wideband (UWB) signals. Processing these UWB signals gives very narrow pulses providing high time resolution, which in turn results in greater accuracy in the calculated position of the tags. Moreover, in UWB delayed pulses are narrow, which means they do not overlap and do not cancel each other. It therefore also gives high robustness against multipath. Suitable signalling devices that deploy UWB signals are available.

There are several ranging techniques in which signals transmitted between the signalling devices 32, 33 and 34 can be processed to determine the relative positions of the devices 32, 33 in the GPM 12 and the device 34 in the CPM 22. These are generally known as positioning protocols.

One approach or positioning protocol is known as time of flight (ToF) or time of arrival (ToA). Time of arrival is the simplest and most common ranging technique, most notable used in the Global Positioning System (GPS). This method is based on knowing the exact time that a signal was sent from a transmitting signalling device, the exact time the signal arrives at a receiving signalling device, and the speed at which the signal travels (essentially the speed of light for radio signals).

Time of arrival, as applied to the positioning apparatus 40, is shown in FIG. 3. A signal is transmitted from the device 34 and received by the devices 32 and 33. Operation of the devices is synchronised by the process controller 42. Knowing the times at which the signal is transmitted by device 34 and arrives at the device 32 and at the device 33 enables the path lengths to be determined between devices 34 and 32 and between devices 34 and 33. And that gives enough information to calculate the relative positions.

FIG. 4 shows coordinates $(x_0, y_0)$ and (x, y) associated with a transmitting device 32 and a receiving device 34 separated by a distance d. It also shows times $t_s$ and $t_a$ associated with the synchronised sending (transmission) and arrival (reception) of the signal between the devices 32, 34. Note that in FIG. 4 the direction of travel of the signal is reversed as compared to that in FIG. 3. This has been done to make the point that the decision to designate the device 34 a transmitter and the devices 32 and 33 receivers or vice versa is simply a design choice. Similarly, the relative positions may be expressed as being relative to the ground pad module (GPM) 12 of FIG. 1 or as being relative to the car pad module (CPM) 22.

Referring to FIG. 4, the distance d from the signalling device 32 at reference position $(x_0, y_0)$ to the position of a target signalling device 34 at position (x, y) can be calculated using the simple equation:

$$d=C(t_a-t_s)$$

where $t_s$ is the time the signal was sent, $t_a$ is the time of arrival of the signal and c is the speed of the radio signal, i.e., the speed of light.

Using this distance d, the location of the target signalling device 34 can be determined. In two dimensions this yields a circle with the equation:

$$d=\sqrt{(x_0-x)^2+(y_0-y)^2}$$

A single signal between two signalling devices 32, 34 only gives sufficient information to determine that the device 34 is on the circumference of a circle at a distance d from the coordinate $(x_0, y_0)$ i.e., the position of the device 32. Another signalling device 33 will give similar information relative to the position of that second signalling device 33.

Figures 5, 6:
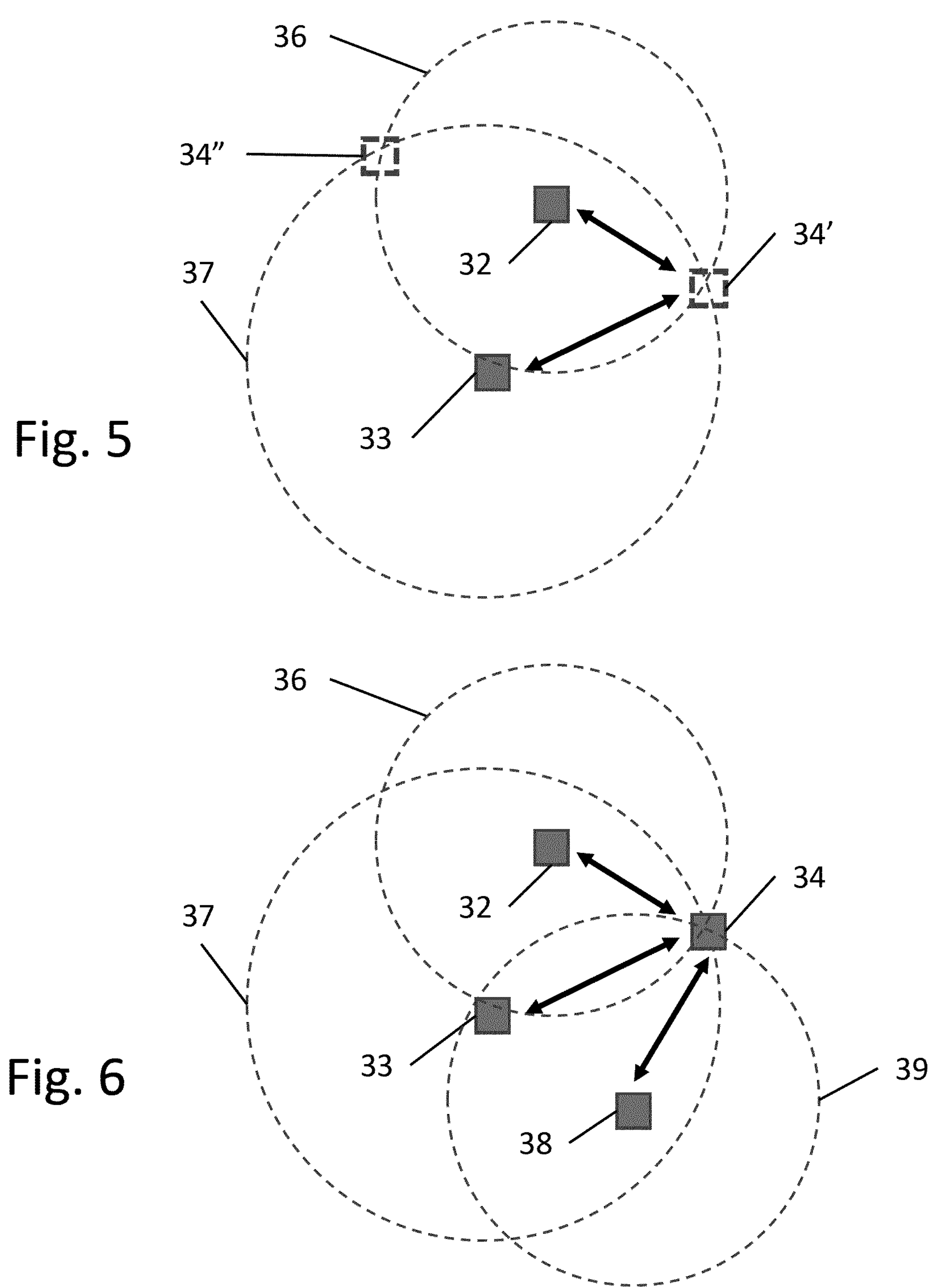
FIG. 5 illustrates a potential uncertainty in calculated position.
FIG. 6 illustrates a way of using signals from three sources to a receiver in determining position.

As shown in FIG. 5, processing of a signal between the signalling device 32 and the signalling device 34 enables the system to determine that the signalling device 34 is positioned somewhere on the circumference of a circle 36 centred on the signalling device 32. Similarly, the processing of a signal between the signalling device 33 and the signalling device 34 enables the system to determine that the signalling device 34 is positioned somewhere on the circumference of a circle 37 centred on the signalling device 33. The device 34 is located where these lines 36, 37 cross.

Thus, one drawback of using the combination of one-plus-two signalling devices as shown in FIGS. 3, 5 and 6 is ambiguity of position. The calculations involve the above quadratic equations and that gives two possible solutions for the position of the device 34. As shown in FIG. 5, the device 34 may be at a position represented by the box 34' or at a position represented by the box 34". Only one solution 34' or 34" is correct.

Sometimes the surrounding environment makes it clear that one solution is not viable. For example, the position 34' may be in an area that does not correspond to a parking space or is, say, behind a wall. But in other circumstances, say a public parking facility, there will not be enough information to determine whether the car is to the left or right of the devices 32, 33 and thus to the ground pad module 12. Left and right are relative terms here. The position could equally be in front or behind depending on the orientation of the ground pad module and the vehicle.

In these circumstances, the system 40 may be designed to eliminate the incorrect calculated position. Where that is not possible, further information is required to ensure accurate determination of the relative positions.

In FIG. 6 a third signalling device 38 is added to the ground pad module 12 (GPM—not shown in FIG. 6) to give further distance information with respect to the signalling device 34 on the car pad module 22 (CPM—not shown in FIG. 6). As can be seen from the diagram, the additional signalling device 38 enables calculation of the position of the device 34 as lying on the circumference of a circle 39 centred on the device 38. The point where the circumferences of the three circles coincide is unambiguously the position at which the signalling device 34 is located.

Further signalling devices may be included in the system to increase the accuracy of positioning. A four-plus-one or a four-plus-two combination will provide greater accuracy than a system based on a three-plus-one or three-plus-two combination of signalling devices. But there is also an increase in cost and weight of the system. Indeed, for some protocols a larger number of devices may be required to obtain sufficient data for the position calculation. The trade-off here, of course, is that more elements increase cost and add weight to the GPM or CPM. The number of signalling devices and their location on the GPM or CPM is therefore a design choice governed by such engineering constraints as cost, weight and accuracy.

Another positioning protocol, known as two-way ranging (TWR), is shown in FIG. 7. A signal is transmitted by the device 34. The signal is received by the devices 32, 33 which transmit signals back to the device 34. The time taken for the signals to travel to the devices 32, 33 and back to the device 34 is proportional to the distance between the devices 34 and 32 and the devices 34 and 33. This approach is useful where synchronisation of clocks is not possible.

This two-way transmission approach enables compensation for differences between clocks in the transmitting device and the receiving device 32, 33, 34. Naturally, internal delays in the devices, e.g., between the device receiving the signal and transmitting a signal in reply, are also taken into account in determining times and thus calculating distances. Once the distances have been determined, it is a simple matter to calculate the relative positions.

Time difference of arrival (TDoA) is like time of arrival (ToA) in that it relies on times of arrival of signals. Time difference of arrival (TDoA) is more versatile than ToA in that it does not require the time that the signal was sent from a target signalling device 34 (see FIG. 4). TDoA only needs to know the speed at which the signal travels (i.e., the speed of light for radio) and the times the signal was received by the signalling devices 32, 33.

The process controller 42 synchronises operation of the signalling devices 32, 33 in time such that the difference in time of arrival can be determined. The difference in arrival time is used to calculate the difference in distances between the target signalling device 34 (i.e., the device whose position is to be determined) and the two reference signalling devices 32, 33 (i.e., the devices whose positions are known).

This difference in distance 11*d* is calculated using the equation:

$$\Delta d = c(\Delta t)$$

where Δt is the difference in arrival times at the two other signalling devices 32, 33. This leads to the equation:

$$\Delta d = \sqrt{(x_1-x)^2+(y_1-y)^2} + \sqrt{(x_2-x)^2+(y_2-y)^2}$$

where $(x_1, y_1)$ and $(x_2, y_2)$ are the known positions of the signalling devices 32, 33 and (x, y) is the position of the signalling device 34.

Other positioning protocols suitable for use in the calculation of relative positions of the ground pad module (GPM) 12 of FIG. 1 and the car pad module (CPM) 22 include phase difference of arrival (PDoA). In a PDoA system two receiving signalling devices are placed close to each other, within half a wavelength of the transmitted signal, in order to avoid ambiguity associated with a 180-degree (±π/2) phase shift that would otherwise occur. PDoA processing by the process controller 42 results in data representing an angle. Data from several receivers can be used in triangulation calculations to determine position.

In addition to that described with reference to FIGS. 4, 5 and 6, position can be calculated from time information using other positioning protocols and mathematical approaches. Orthogonal (x, y) coordinates (49—see FIG. 2) could be replaced by polar (r, Φ) coordinates. The mathematical approach chosen depends in varying degrees on the positioning protocol being used. The mathematics is documented elsewhere and, in the interest of brevity, will not be described in any detail herein.

Proprietary signalling devices are available that use a two-way ranging approach called 'asymmetric double-sided two-way ranging', which uses various techniques to cancel errors and other inaccuracies. Devices using this asymmetric approach are suitable for use in the system 40.

Figure 8:
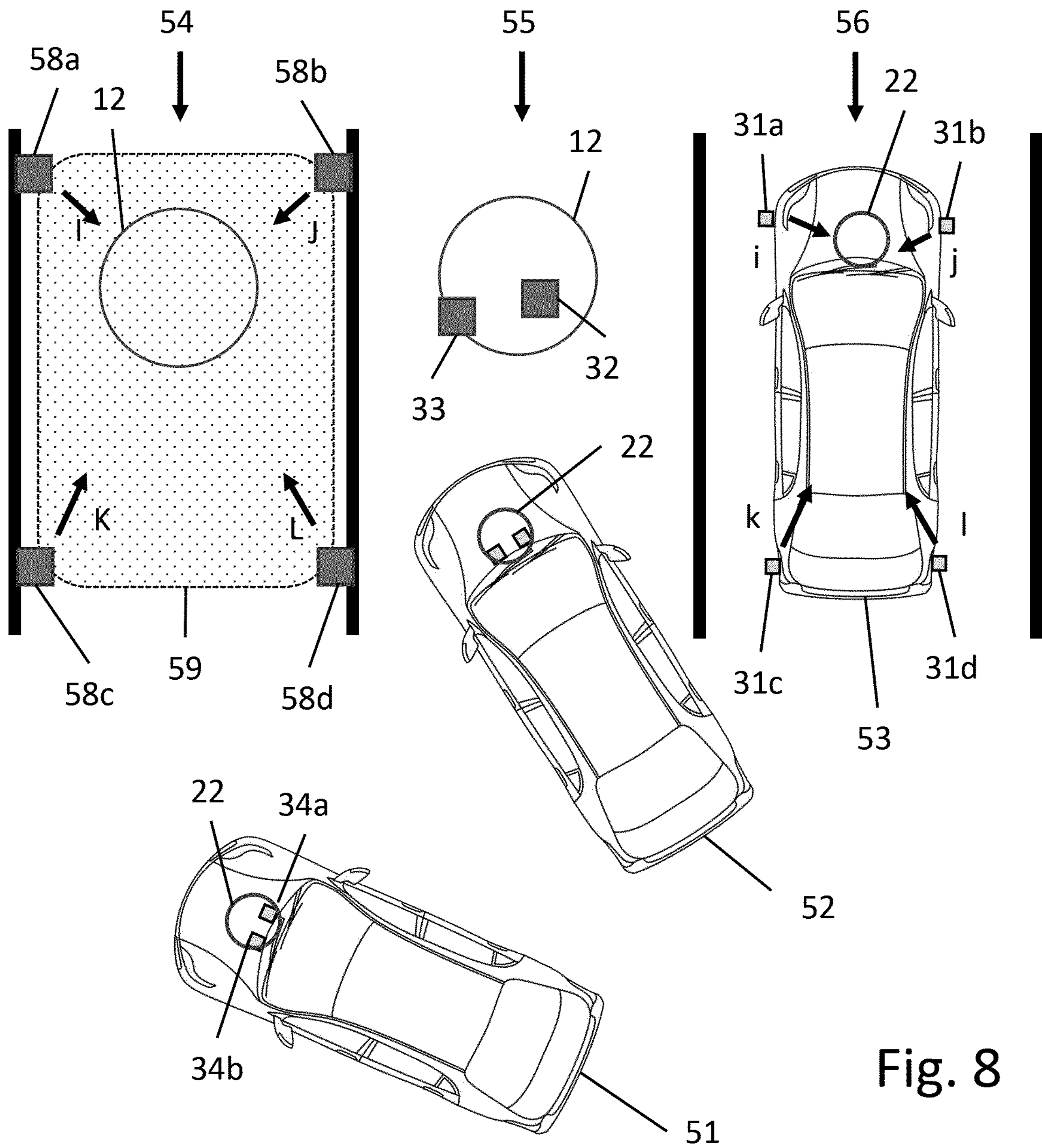
FIG. 8 shows cars relative to parking bays.

FIG. 8 shows cars 51, 52, 53 relative to parking spaces 54, 55, 56. A ground pad module GPM 12 is placed in the parking space 54 at a position convenient for the car 51 to park with its car pad module CPM 22 positioned such that the coils (not shown) in the CPM 22 and the GPM 12 are aligned. Four positions signalling devices 58*a*-58*d* are provided in the vicinity of the parking space 54, e.g., around the parking space and signals are transmitted between those signalling devices 58*a*-58*d* and signalling devices 34*a*, 34*b* at the CPM 22 on the car 51.

Plainly, the signalling devices 58*a*-58*d* are not located at the GPM 12. But the positions of the GPM 12 and the signalling devices are static and their spatial relationship is therefore known. The positions of the signalling devices 58*a*-58*d* can therefore be defined by offsets I, J, K, L relative to, say, the centre of the coil in the CPM 12. The position of the GPM 12 can be readily determined from the spatial relationship and is thus also known.

As car 51 approaches parking space 54, positioning signals are transmitted between the devices 58*a*-58*d* associated with the parking space 54 and the devices 34*a*, 34*b* associated with the CPM 22 on the car 51. The position of the devices 34*a*, 34*b*, and thus that of the CPM 22 and indeed the car 51, is calculated by processing the signals in the manner described above. The position is calculated repeatedly to provide guidance information to the vehicle as it moves toward the parking space.

The ground pad module 12 in parking space 55 includes signalling devices 32, 33 which work with similar devices on the car pad module 22 in the car 52 as the car enters the parking space. This arrangement works in the same manner as already described with reference to FIGS. 1 and 2.

The car 53, already parked in the space 56, has position signalling devices 31*a*-31*d* located at different positions on its body. Each of the devices 31*a*-31*d* is offset from the CPM 22 by an offset vector i, j, k, l. The position of the CPM 22 is therefore known and is taken into account when guiding the car 53 into the space 56.

Positioning systems such as the one described herein give very accurate position information down to a few centimetres when the static signalling devices 32, 33 (a.k.a. anchors) enclose an area (e.g., area 59 in FIG. 8) and the mobile signalling devices 34 (a.k.a. tags) are within the defined area.

Positional accuracy can suffer where the signalling devices are proximate. This can be a problem where the signalling devices are placed close together on the ground pad module 12 and/or close together on the car pad module 22, as is the case of parking space 55 and car 52 in FIG. 8. In this situation the GPM signalling devices (anchors) will usually be less than 600 mm apart—the typical width of a GPM—and the CPM signalling devices (tags) less than 300 mm apart—the typical width of a CPM.

Where possible, the placement of anchors 58*a*-58*d* around the parking space 54 (see FIG. 8) will help to mitigate this problem. Similarly, the placement of tags 31*a*-31*d* around the car 56 in FIG. 8 will serve to improve the accuracy as compared to that with signalling devices clustered on the CPM. Such placement is, of course, dependent on the constraints of the specific implementation.

Figure 9:
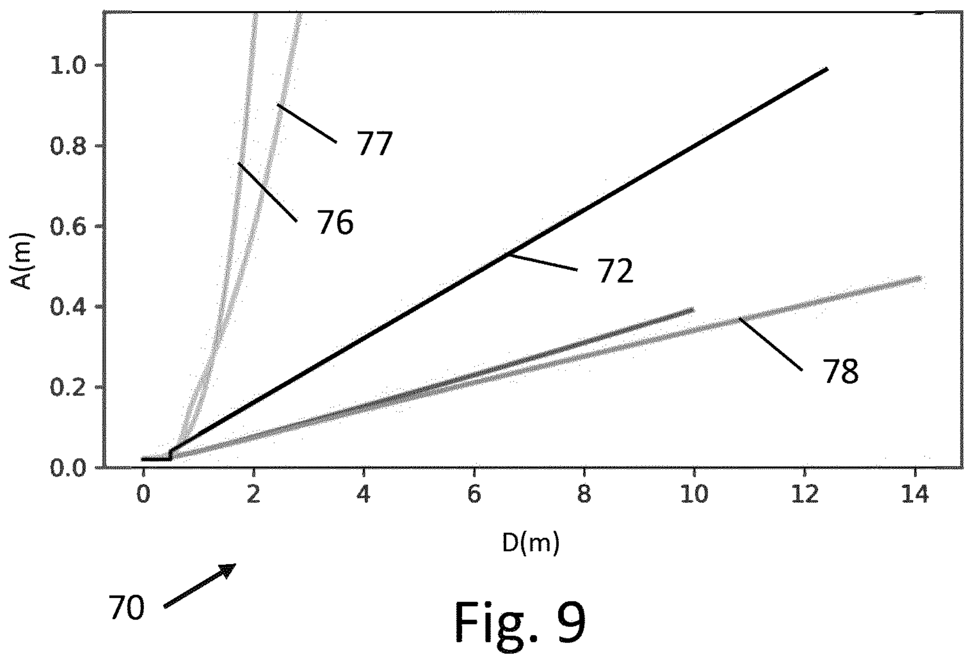
FIG. 9 is a graph showing longer range accuracy.
Figure 10:
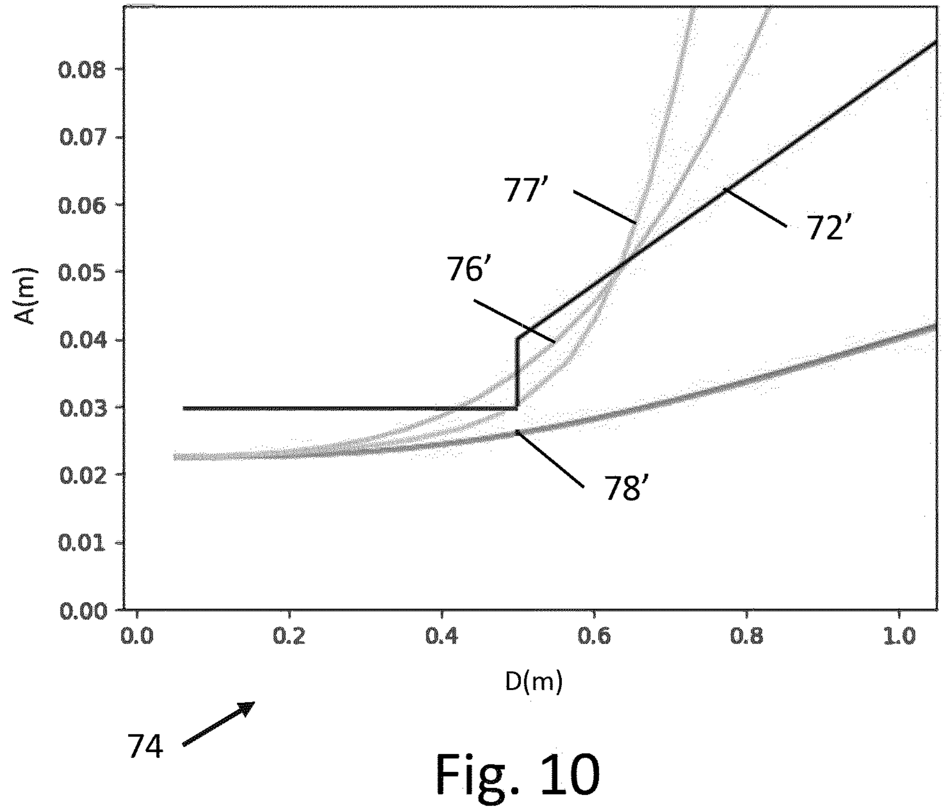
FIG. 10 is a graph showing shorter range accuracy.

Positional accuracy can also fall off quickly with distance when the signalling devices or tags on the car are outside the defined area 59. This is shown in FIGS. 9 and 10 in which graphs show several lines representing different levels of accuracy or tolerance. These graphs were generated during simulations and are close to experimental results obtained subsequently. Each graph 70, 74 has a horizontal axis representing distance (D) in metres between the ground pad module 12 and the car pad module 22 (See FIG. 1) in meters. The vertical axis represents accuracy (A) in metres of the calculated distance.

In FIG. 9, line 72 represents positioning to an arbitrary level of accuracy deemed—for the purpose of illustration—to be acceptable for a system of a given design. When a vehicle is outside a parking space, e.g., car 51 in FIG. 8, a tolerance or accuracy of approximately 8-10% may well be acceptable. As the vehicle gets closer to and then enters a parking space, e.g., car 52 in FIG. 8, greater accuracy is required as the car pad unit moves into alignment with the ground pad unit.

The same line 72 is shown in the graph 74 to a larger scale in FIG. 10. The line is given the designation 72' merely to distinguish graph 74 from graph 70. The line is the same in both. In FIG. 10, the graph 74 is shown over a smaller distance of zero to one meter compared to the zero to 14 m scale of graph 70 in FIG. 9. For the purpose of illustration here the positioning system is required to have a tolerance of 2-3 cm, i.e., the calculated position is within 2-3 cm of the actual position from a distance between the GPM and the CPM of less than 0.5 m.

In addition to the line 72, 72' representing a desired tolerance or accuracy, both graphs 70 and 74 show two lines 76, 76' and 77, 77' representing the accuracy of a system in which time difference of arrival (TDoA) is deployed as the positioning protocol. Here the signalling devices are radio-based and have antennas with slightly different along-axis and along-diagonal characteristics. Line 76, 76' shows the along-axis accuracy and line 77, 77' the along-diagonal accuracy. Both lines 76' and 77' are close to and below the desired tolerance line 72' in the short range of less than ~0.4 m and are acceptable. Line 72' changes abruptly from diagonal to horizontal at 0.5 m because of the way this tolerance line 72' has been defined. The line 76' is slightly above the abrupt change in line 72'. This is merely an artefact from the abrupt definition that makes very little difference in practice.

As can be seen in both FIGS. 9 and 10, the TDoA lines 76, 76' and 77, 77' rapidly rise above the required tolerance line 72, 72' at distances over 0.5 m. This means that, while TDoA is able to give acceptable accuracy when the vehicle reaches the parking space and the tags are inside, it is unable to deliver the desired tolerance at further distances outside the parking space.

However, TDoA also offers the advantage of being able to provide angular information. This angular information remains useful even outside the parking space. The angular information can still be used in the positioning calculations. Of course, the angular information is also useful when it comes to aligning the vehicle 51, 52, 53 in a parking space 54, 55, 56 (see FIG. 8).

Although not shown in FIG. 9 or FIG. 10, it should be noted that the phase difference of arrival (PDoA) protocol similarly gives good angular information which is useful for both distance and final alignment of the car inside the space. PDoA may therefore be used as well as or instead of TDoA.

The graphs of FIGS. 9 and 10 also show a line 78, 78' representing the accuracy of a two-way ranging (TWR) or time of flight (ToF) arrangement. As can be seen in FIG. 10, the accuracy of this ToF positioning protocol is similar to that of the TDoA protocol below ~0.5 m. It is, however, significantly better—and well within the desired tolerance—at distances greater than ~0.5 m. ToF is therefore suitable for use in guiding a car or other vehicle over several metres toward a parking space.

One way of implementing the two approaches would be to use TWR or ToF outside the parking space and then change to TDoA or PDoA to guide the vehicle as it enters a space, e.g., as shown for car 52 and space 55. However, using a combination of two positioning protocols both outside and inside the parking space gives greater accuracy than using only one. Put simply, TWR is good for range and TDoA good for angle. Together they provide greater accuracy than individually, especially, but not only, outside the space. Implementing two different protocols does not require additional hardware. The same signalling devices can be used for both.

In the foregoing, the signalling operations performed by the positioning system are assumed to be performed on radio signals transmitted, received, or transmitted and received by the signalling devices 32, 33, 34. The use of radio signal is common, but it is not the only approach.

Other suitable signalling devices include ultrasonic time of flight sensors which send out an ultrasonic pulse, and then listen for echoes returning from targets in the sensor's field-of-view. By calculating the distance based on the time of flight (ToF) and speed of sound, the sensor can determine the distance of an object relative to a device.

Another approach would be to use beacons as the transmitting signalling units to send out signals to multiple receivers which are arranged to measure the power therein. The powers of the received signals would be compared across different receivers, and the receiver "hearing" the beacon with the highest power level considered to be closest to the beacon.

Modern cars are being designed increasingly to include more signalling devices, sensors and monitoring sub-systems to control many routine operations associated with the running and driving of the vehicle. In the interest of saving cost and depending on the equipment to be supplied on a given model of car, it may be possible to use some of the other equipment to assist in the aligning process. Suitable existing sensors provided for other subsystems may be deployed in the above-described determination of distance. For example, data from accelerometers or inertial sensors provided on the vehicle may be fed into the process controller 42 (FIG. 2) to provide supplementary angular information.

Modern vehicles usually comprise a user interface, i.e., a monitor in the dashboard that displays useful vehicle information while stationary and driving. The positioning apparatus may be configured to output position data to the user interface for display of location information that assists the driver in parking the vehicle so that the charging system coils are aligned. Data from the coil-positioning system may be displayed to provide a visual aid to parking. Or the data may be provided to a self-parking system to include coil alignment in its functionality. For cars that include a self-parking feature, the positioning apparatus output data may be fed to the self-parking equipment to assist that equipment in guiding the car to the correct charging position in, e.g., a garage or parking space.

Having described by reference to the accompanying drawings an apparatus for use in guiding an electric vehicle to a position in which a magnetic coil on the vehicle is placed relative to a supply magnetic coil at a charging location such that energy can be transferred between the vehicle coil and the supply coil; a pad module for use with another pad module to transfer power magnetically in an electric vehicle charging system; and a method of guiding an electric vehicle to a position in which a vehicle magnetic coil is placed relative to a ground magnetic coil at a charging location such that energy can be transferred between the vehicle coil and the ground coil, it is to be understood that the same have been described by way of example only and that modifications and variations such as will occur to those possessed of appropriate knowledge and skills may be made without departure from the spirit and scope of the invention as set forth in the accompanying claims and equivalents thereof.

The invention claimed is:

1. A pad module for use with a second pad module to transfer power magnetically in an electric vehicle charging system associated with an electrical vehicle, the pad module comprising:

at least one signaling device for transmitting and receiving positioning signals for or from two or more signaling devices associated with the second pad module; and a process controller coupled to the signaling device or signaling devices, the process controller configured to perform operations comprising:

controlling transmission and reception of the positioning signals by the signaling device or signaling devices;

processing the positioning signals to obtain time-related information pertaining to differences between the transmission and the reception of the positioning signals, and between plural received signals;

determining from the time-related information distances between the signaling devices associated with the pad module and the second pad module;

obtaining the time-related information from the positioning signals using at least two positioning protocols from a set of protocols including a time of flight ToF, a two-way ranging TWR, a time difference of arrival TDoA, and a phase difference of arrival PDoA;

determining positioning information using the time of flight ToF or the two-way ranging TWR, and the time difference of arrival TDoA or the phase difference of arrival PDoA, of the positioning protocols; and transmitting the positioning information to the vehicle, wherein the vehicle is guided based on the positioning information.

2. The pad module as claimed in claim 1, wherein the operations comprise:

determining the positioning information over a first range using the time of fight Tor or the two-way ranging TWR of the positioning protocols, and determining the positioning information over a second range using the time difference of arrival TDoA or the phase difference of arrival PDoA of the positioning protocols, wherein the second range is shorter than the first range.

3. The pad module as claimed in claim 1, wherein the pad module further comprises a magnetic coil to transfer power, wherein the signaling device or signaling devices are located in the pad module at a known position or known positions with respect to the magnetic coil, and wherein the operations comprise processing the positioning signals to determine a position of the second pad module relative to the coil.

4. The pad module as claimed in claim 1, wherein the pad module further comprises a magnetic coil to transfer power, wherein the pad module is suitable for installation at a location, the signaling device or signaling devices are suitable for placement at the location apart from the pad module at a known position or known positions with respect to the coil, and wherein the operations comprise processing the positioning signals to determine the position of the second pad module relative to the coil.

5. The pad module as claimed in claim 4, wherein the pad module is suitable for installation at the vehicle as a vehicle pad module and the signaling device or the signaling devices are suitable for placement at locations on the vehicle.

6. The pad module as claimed in claim 4, wherein the pad module is suitable for installation at a parking location as a ground pad module and the signaling device or the signaling devices are suitable for placement at locations in the vicinity of the parking location.

7. An inductive power transfer system comprising a first pad module and a second pad module according to claim 4, wherein:

the first pad module is suitable for installation at the vehicle as a vehicle pad module and the signaling device or the signaling devices are suitable for placement at locations on the vehicle; and the second pad module is suitable for installation at a parking location as a ground pad module and the signaling device or the signaling devices are suitable for placement at locations in the vicinity of the parking location.

8. The inductive power transfer system as claimed in claim 7, wherein the vehicle pad module comprises the at least one signaling device, and the ground pad module comprises the two or more signaling devices.

9. An apparatus for use in guiding an electric vehicle to a position in which a vehicle magnetic coil on the vehicle is placed relative to a ground magnetic coil at a charging location such that energy is transferable between the vehicle magnetic coil and the ground magnetic coil, the apparatus comprising:

signaling devices mountable relative to the ground magnetic coil and the vehicle magnetic coil, with at least one signaling device associated with a first one of either the vehicle magnetic coil or the ground magnetic coil, and at least two signaling devices associated with a second one of either the vehicle magnetic coil or the ground magnetic coil, wherein each signaling device is able to transmit and receive positioning signals for or from other ones of the signaling devices: and a process controller coupled to the signaling devices, the process controller configured to perform operations comprising:

controlling transmission and reception of the positioning signals by the signaling devices;

processing received signals to obtain time-related information pertaining to differences between the transmission and the reception of the positioning signals, and between plural received signals, determining from the time-related information distances between the signaling devices and thus a relative position of the ground magnetic coil and the vehicle magnetic coil;

obtaining the time-related information from the positioning signals using at least two positioning protocols from a set of protocols including a time of flight ToF, a two-way ranging TWR, a time difference of arrival TDoA, and a phase difference of arrival PDoA;

determining positioning information using the time of fight Tok or the two-way ranging TWR, and the time difference of arrival TDoA or the phase difference of arrival PDoA of the positioning protocols; and transmitting the positioning information to the vehicle, wherein the vehicle is guided based on the positioning information.

10. The apparatus as claimed in claim 9, wherein the operations comprise:

determining the positioning information over a first range using the time of flight ToF or the two-way ranging TWR of the positioning protocols, and determining positioning information over a second range using the time difference of arrival TDoA or the phase difference of arrival PDoA of the positioning protocols, wherein the second range is shorter than the first range.

11. A method of guiding an electric vehicle to a position in which a vehicle magnetic coil is placed relative to a ground magnetic coil at a charging location such that energy is transferable between the vehicle magnetic coil and the ground magnetic coil, the method comprising:

transmitting positioning signals from at least one or from two or more signaling devices;

receiving the positioning signals either from the at least one signaling device by the two or more signaling devices, or from the two or more signaling devices by the at least one signaling device;

processing received signals to obtain time-related information pertaining to differences between transmission and reception of the positioning signals, and between plural received signals;

determining from the time-related information distances between the signaling devices and thus a relative position of the ground magnetic coil and the vehicle magnetic coil;

obtain the time-related information from the positioning signals using at least two positioning protocols from a set of protocols using a time of flight ToF, a two-way ranging TWR, a time difference of arrival TDoA, and a phase difference of arrival PDoA;

determining position information using the time of flight ToF or the two-way ranging TWR, and the time difference of arrival TDoA or the phase difference of arrival PDoA of the positioning protocols; and transmitting the positioning information to the vehicle, wherein the vehicle is guided based on the positioning information.

12. The method as claimed in claim 11, further comprising:

determining position information over a first range using the time of flight ToF or the two-way ranging TWR of the positioning protocols; and determining position information over a second range using the two time difference of arrival TDoA or the phase difference of arrival PDoA of the positioning protocols, wherein the second range is shorter than the first range.

* * * * *